United States Patent [19]

Schael et al.

[11] 4,012,110

[45] Mar. 15, 1977

[54] BINOCULAR OPTICAL APPARATUS WITH ADJUSTABLE INTEROCULAR DISTANCE, PARTICULARLY FOR MICROFILM VIEWERS

[76] Inventors: Rudi Schael, Kandinskystr. 27, D-8 Munich 71; Kurt Kellner, Langburgenerstr. 2, D-8 Munich 90, both of Germany

[22] Filed: Jan. 26, 1976

[21] Appl. No.: 652,393

[30] Foreign Application Priority Data

Jan. 28, 1975 Germany .......................... 2503419

[52] U.S. Cl. .................................. 350/75; 350/35; 350/145
[51] Int. Cl.² ...................... G02B 7/12; G02B 27/02
[58] Field of Search .............. 350/75, 76, 145, 36, 350/139, 16, 35

[56] References Cited

UNITED STATES PATENTS 3,814,496   6/1974   Mukai .............................. 350/75

Primary Examiner—John K. Corbin
Assistant Examiner—Jon W. Henry
Attorney, Agent, or Firm—Hauke & Patalidis

[57] ABSTRACT

A binocular optical apparatus provided with an objective and eyepiece lens system and using a mirror system for deflecting a light beam from the illuminated object to the eyepieces. The interocular separation, or distance between the eyepieces is adjustable by way of making the optical axis of at least one eyepiece swivelable relative to the optical axis of the other eyepiece at an angle determining the interocular distance of the eyepieces within an angle conforming to the range of natural eye movement such as to avoid eye strain. One of the mirrors of the mirror system is angularly movable at half the angle of motion of the movable eyepiece during adjustment to an appropriate interocular distance, by means of a lever drive arrangement, such that the image projected by the mirror into the eyepiece plane remains stable during adjustment of the interocular distance. The invention has particular applications for microfilm binocular viewers having a high magnification rate.

17 Claims, 3 Drawing Figures

BINOCULAR OPTICAL APPARATUS WITH ADJUSTABLE INTEROCULAR DISTANCE, PARTICULARLY FOR MICROFILM VIEWERS

CROSS-REFERENCE TO RELATED APPLICATIONS

The present application is a companion case of application Ser. No. 652,394 for "Illumination Unit for Microfilm Readers" filed contemporaneously herewith.

BACKGROUND OF THE INVENTION

Optical devices for enlarging microfilms or microfiches, often called microfilm viewers, permit to obtain a high ratio magnification of small size written or illustrated material, such as files, catalogs, documents and data lists of all kinds, from their reduced format on microfilm to a readable format. Microfilms or michrofiches are known to considerably reduce the size of the storage requirements for documentation and information of all kinds, while enabling the user rapid access to the information. Most of the microfilm viewers in use today are of the rear projection screen type. Basically, such viewers comprise a lamp with an appropriate reflector and condenser for illuminating the microfilm with a high light intensity, combined with an objective lens enlarging the illuminated portion of the microfilm and projecting an image onto a translucid viewing screen. The image projected on the translucid screen is therefore observed through the translucid screen, with the screen illuminated by the image projected on the other side of the screen. An enlargement to at least 70% of the original size of the material is necessary in order to reproduce the information stored on the microfilm to a readable format. This in turn requires a projection screen of such dimension that the microfilm reading units normally available on the market are in the form of large size table models with corresponding large space requirements. Portable microfilm readers, however, have been developed which, in some cases, are even collapsible. Unfortunately, even the collapsible units are relatively large and heavy, and they require many controls for their operation. Further disadvantages of projection screen microfilm viewers is that ambiant lighting decreases considerably the contrast of the image projected on the projection screen. In addition, the operation of such units is usually dependent on the availability of electrical outlets.

In order to eliminate some of the disadvantages connected with projection screen microfilm viewers, small pocket reading units have been developed which operate according to a magnifying lens principle with illumination of the microfilm by daylight or by artificial light, power for the artificial light being supplied by batteries. However, currently available microfilm readers of this type are monocular and are, as a consequence, limited to providing a magnification generally not exceeding 24X.

The present invention relates to a microfilm reading unit or viewer which operates according to a binocular microscope principle, that is which is provided with an objective lens system, a pair of eyepieces and, in addition for providing a high magnification in spite of the small size of the unit, a plurality of reflecting elements for increasing the path length of the light rays between the object plane and the image plane. Such an arrangement of the optical path permits to obtain at least a 45X magnification. In addition, binocular viewing of the microfilm material is much less tiring for the human eye than monocular viewing, and it provides a far better image. However, practical binocular viewing devices necessitate means for adjusting the interocular distance, especially since the eye separation in humans varies greatly. The range of normal interocular distance is comprised between 55 and 75mm.

German Patent Publication No. 1,098,233 discloses an arrangement for adjusting the interocular distance in binocular optical devices operating according to the microscope principle, i.e., with objective and eyepiece lens systems wherein the light beam trajectory between the object and the image is reflected by means of mirrors and wherein one eyepiece and its optical axis are angularly positionable around the axis of the other eyepiece at an angle approximating that of the human eye natural movement. The device disclosed comprises a swiveling mirror located in the axis of the light beam which is arranged to follow the swiveling motion of the eyepiece at one half the eyepiece angular displacement by means of a gear drive. The image projected by the mirror onto the eyepiece image plane remains stable during adjustment of the interocular distance.

The arrangement disclosed in the above mentioned German Patent for adjusting the interocular distance comprises an adjustment means for the mirrors disposed in the optical path which consists of a so-called "one-arm" lever attached at an end by way of a ball joint to the non-movable tubular housing and at the other end to the rear extension of the movable eyepiece stud also by means of a ball joint. When the eyepiece stud is rotated, the lever is displaced causing a bracket supporting the mirror at its optical center to be also moved such that the mirror is rotated exactly one half the angle of rotation of the eyepiece stud. In order for the bracket to always abut against the co-operating one-arm lever, the mirror mount is provided with an additional bracket to which is attached the end of a tensioned spring. For the purpose of enabling pivoting of the movable deflection mirrors, they are mounted on pivot disks mounted on the tubular housing and around which the eyepiece studs are pivoting. This arrangement, for the adjustment of the interocular distance, therefore requires many high precision parts and results in a complicated structure. More particularly, the relatively expensive ball joints require special mention, and the lever supporting the ball joints must be preloaded against the eyepiece stud by means of a pressure spring. The ball joints, due to high surface loading, are subject to severe wear and tear which after a short period of time reduces considerably the effective operation of the device. In addition, fatigue of the tension pressure spring forming part of the transmission mechanism causes a considerable decrease of the accuracy of operation of the adjusting mechanism. If the spring breaks, the whole adjustment mechanism becomes inoperative. Finally, the adjustment mechanism lacks an adjustment means for adjusting with precision the angle of the pivotable mirrors, initially and as a result of the loss of precision of the original adjustment through use of the apparatus. Consequently, every single part of the adjustment drive mechanism must be manufactured with high precision and finely adjusted and assembled to the other components with very close tolerances such that a precise and correct adjustment of the mirror must be the result of careful assembly of the component parts of the viewer. When the components become worn, for example, and more particularly the ball joint bearings, due to wear and tear, these parts must be replaced completely, in order for the unit to become again operative with precision.

The present invention has for a principal object to provide a simple and effective device for the adjustment of the interocular distance of the eyepieces in a microfilm viewer, which does not present the disadvantages of the precedently described mechanism and which is particularly well suited for incorporation in microfilm readers having a high magnification ratio.

This object is accomplished, according to the present invention, by providing a drive mechanism having a straight line displaceable plate member and by providing at least one mirror and one eyepiece support mount which are pivotable around a common pivot axis, whereby the plate member is caused to move as a result of the angular displacement of the eyepiece mount thus in turn turning the mirror support, the eyepiece mount and the mirror support being connected to the plate member by arm lever lengths causing the mirror to pivot substantially one half of the pivoting angle of the eyepiece.

The mechanism according to the present invention which, in contrast to the prior art devices, also comprises a precise adjustment of the interocular distance by way of the motion of only one of the eyepieces, for example, is provided with a very simple structure and has a long life expectancy with a high practical safety factor. The mechanism of the invention consists principally of only a pair of simple levers with flat member elements which are arranged for all practical purposes in a single plane. Accordingly, the operation of the mechanism of the invention is also very simple, i.e., only a single displaceable plate member is firmly connected through a lever with the eyepiece mount, and is displaced rectilinearly as a result of the pivoting of the eyepiece mount. The plate member, in turn, displaces the second lever adapted to pivot the deflecting mirror one half of the angular displacement of the eyepiece mount.

The particular arrangement of the present invention for connecting the levers with the plate, as compared to the expensive ball joint mounting of the prior art device, is effected simply by providing right angle projections on the end of the levers engaging into appropriate apertures in the plate. In addition, it is not necessary to provide a spring for the proper operation of the adjustment mechanism of the structure according to the present invention as compared to the prior art mechanism. Due to its simple structure, the mechanism of the invention requires a small space for mounting and, more particularly, its flat, robust design makes the unit particularly well suited for incorporation into portable units of small overall dimensions, such as portable high magnification viewers for the reading of microfilms.

The fact that, in the mechanism according to the present invention, the plate member transferring the pivoting motion of the eyepiece mount to a pivoting motion of the mirror support results only in a linear rather than an exactly required turning motion, is of practically no significance. Since, within the normal range of usual variations in human eye separation, the pivoting angle of the eyepiece and the corresponding pivoting half angles of the mirror are relatively small, any misalignment of the image reflected by the mirror is only of such insignificant degree that the resulting shift of the image is practically not recognized by the human eye at all. The misalignment of the image as a result of using a linearly displaceable plate member is particularly small in the embodiment according to a further characteristic of the present invention, wherein the displacement direction of the plate is parallel to the optical axes of the eyepieces when the eyepieces are adjusted to the smallest interocular distance, whereby the eyepiece mount and the mirror support are aligned with the plate member in such a manner that the reflective surface of the mirror, at its middle position, is rotated exactly one half the angular displacement of the eyepiece. In such a case, a mathematically correct image without any misalignment is obtained, assuming that most interocular distances are of normal dimensions. In the direction of the lowest as well as of the highest limit of the interocular distance however, due to a relatively small pivoting angle, as hereinbefore explained, the follow-up of the mirror rotation at one half the angle of pivoting of the eyepiece provides a very good approximation.

Advantageously, an adjustment or calibration screw is provided for the original set up of the angular position of the mirror, such adjustment screw being preferably provided at the end of the mirror support. With such a simple arrangement, the preset calibration screw may be operated from the outside of the housing by means of a screw driver, and the position of the mirror may be adjusted for an average interocular distance such that the images at the two eyepieces match exactly and completely. This pre-adjustment of the mirror is usually necessary only once, namely prior to the first use of the viewer.

A further improvement of the accuracy of the adjustment mechanism for interocular distance results additionally from providing a spring, according to the present invention, mounted between the eyepiece and the mirror support, such as to provide an appropriate preload eliminating any mechanical play in the drive mechanism.

A modification of the present invention provides both eyepieces as pivotable, and by providing a single common guide plate member linearly movable as a result of the relative pivoting of the eyepiece mounts appropriately aligned relative to the plate member, the plate member in turn controls the pivoting of two mirrors such as to coordinate the pivoting of the mirrors with the relative pivoting of the separate eyepieces. In this embodiment of the invention, therefore, both eyepieces are simultaneously pivotable about a common axis, and are provided with a common drive mechanism driven by the pivoting motion of the eyepiece mounts which in turn cause pivoting of the image projected by the mirrors into the plane of the eyepieces. Such a structure is therefore capable of providing perfectly symmetrical images.

The objects and advantages of the present invention will become apparent to those skilled in the art when the following description of the best mode contemplated for practicing the invention is read in conjunction with the accompanying drawing wherein like reference numerals designate like or equivalent parts and in which:

DETAILED DESCRIPTION OF THE PREFERRED EMBODIMENTS

Figure 1:
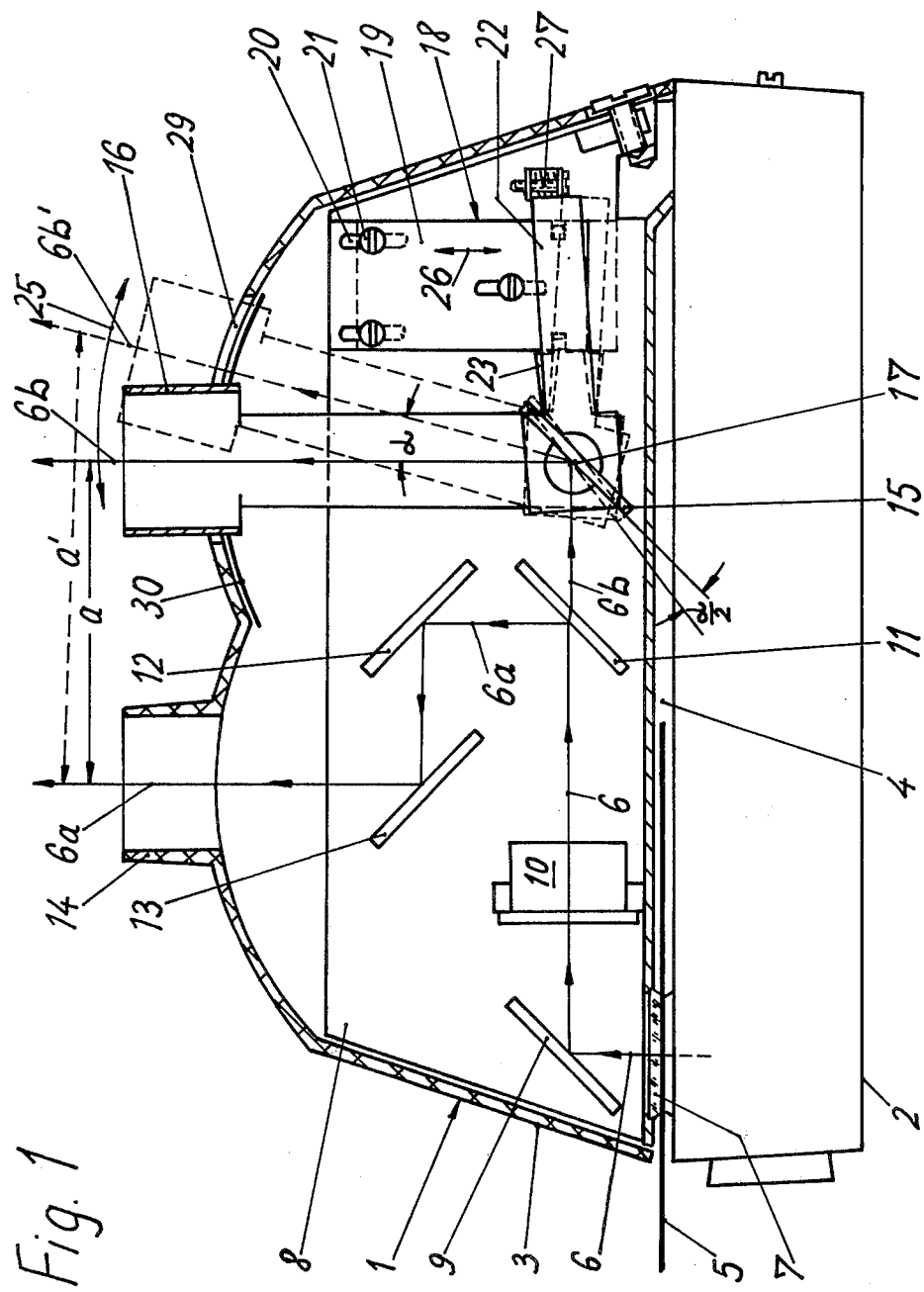
FIG. 1 is a schematic section through a microfilm viewer according to the present invention provided with an adjustment mechanism for the interocular distance.

Referring to the drawing, and more particularly to FIG. 1 thereof, the elements forming a microfilm viewer according to the present invention are enclosed within a housing 1. The housing 1 is made of an upper enclosure 2 and a lower enclosure 3 which, in the structure illustrated, are interconnected by appropriate means leaving therebetween a slot for accepting a microfilm 5.

The housing enclosure 2 contains an appropriate arrangement of elements for illuminating the microfilm 5, such arrangement of parts being either of a structure well known to those skilled in the art and requiring no further description for the purpose of disclosure of the invention or, preferably, consisting of the microfilm illumination system disclosed in copending application Ser. No. 652,394. The housing enclosure 3 contains the mechanism for the magnification of the microfilm and the appropriate optical system for viewing the microfilm, as well as the assembly providing an adjustment of the interocular distance, according to the present invention. For the purpose of illustration, the housing enclosure 3 is shown with a portion cut out for revealing the internal construction.

Light provided by the illumination system contained in the housing enclosure 2 passes through a portion or the microfilm 5 positioned in front of a transparent window or aperture 7 disposed in the wall of the housing enclosure 3. For the sake of simplification, only the optical axis of the light beam is represented arbitrarily by arrow 6, the arrowhead designating the direction of propagation of the light beam. The housing enclosure 3 contains a support bracket 8 mounted therein and on which are fastened all the component parts of the optical system according to the binocular microscope principle, as well as the mechanism for adjusting the interocular distance. After passing through the transparent window 7, the light beam 6 is deflected by a first plane mirror 9 mounted on the support plate 8, passes through an objective lens system 10, and impinges upon a semi-transparent plane mirror, or beam splitter, 11. The beam splitter 11 divides the light beam 6 into a pair of similar light beams 6a and 6b. The light beam 6a, after reflection by two additional plane mirrors 12 and 13, passes through a first eyepiece, not shown for the sake of clarity, inserted in the eyepiece mount 14 and provided with an appropriate lens system furnishing the required magnification of the image.

The second light beam 6b, transmitted by the beam splitter 11, is similarly projected through an eyepiece, not shown, disposed in an eyepiece mount 16, after having been reflected by a plane mirror 15. It will be readily apparent that, in this manner, the microfilm 5 appears in the eyepieces as appropriately enlarged images which are easily readable by the user of the viewer.

For the purpose of providing an accurate adjustment of the interocular distance, the eyepiece mounted in the eyepiece mount 16, together with the eyepiece mount 16, is angularly pivotable of an angle from the position shown in solid line in the drawing corresponding to the narrowest interocular distance $a$ to the position corresponding to the widest interocular distance $a'$. The axis 17 of rotation of the reflective surface of the mirror 15 is, in the illustration of FIG. 1, perpendicular to the plane of the drawing, in other words perpendicular to the mounting bracket 8, and coincides with the apex of the angle $\alpha$ of pivoting of the adjustable eyepiece mount 16. The angle $\alpha$ is approximately 15° and is therefore within the normal range of human eye rotation. The minimum interocular distance $a$ is preferably 55mm, while the maximum interocular distance $a'$ is approximately 75mm.

If the adjustable eyepiece mount 16 has to be pivoted about the pivot axis 17 a certain angle for correct adjustment of a given interocular distance, the mirror 15 must also be pivoted so that the image reflected by the mirror 15 to the corresponding eyepiece image plane remains constant. For that purpose, as can be seen in the drawing, the mirror 15 must be pivoted to an angle which is half the angle of pivoting of the eyepiece, in the same direction as the eyepiece. For that purpose, the mechanism of the invention for adjustment of the interocular distance is provided with a drive, generally designated at 18, for causing the mirror 15 to follow up the displacement of the eyepiece mount 16 from its position shown in solid line, for the narrowest interocular distance $a$, to the position shown in dash line, for the widest interocular distance $a'$.

Figure 2:
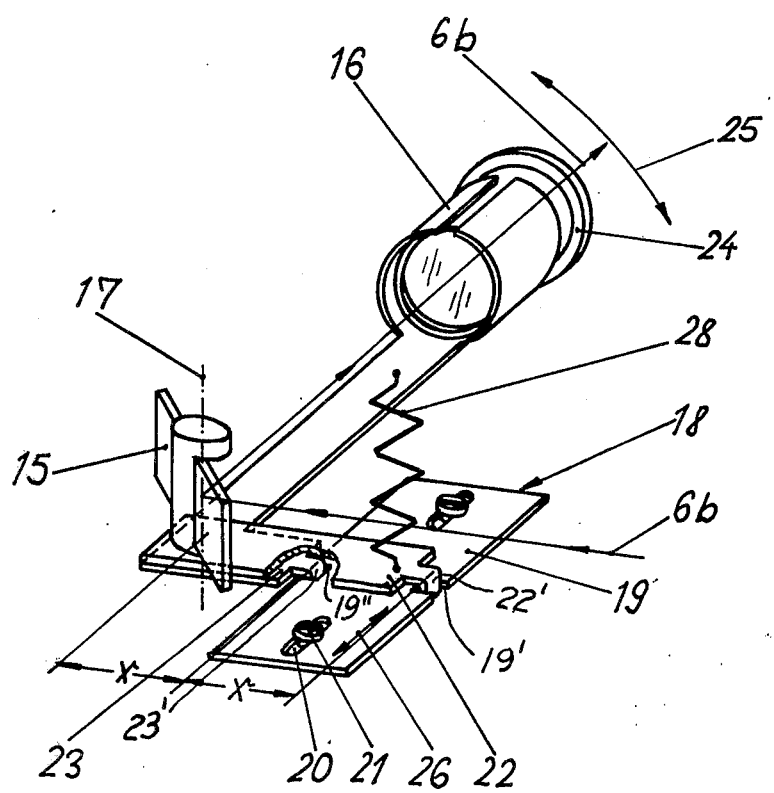
FIG. 2 is a perspective detailed view of a portion of the adjustment mechanism.

As shown in FIG. 1, and in further detail at FIG. 2 in a perspective view, the drive mechanism 18 comprises a plate member 19 mounted on the support bracket 8 by means of elongated guide apertures 20 through each of which is inserted a guide bolt or screw 21 threading in appropriate threaded holes in the support bracket 8, such that the plate member 19 is linearly reciprocable, always remaining parallel to itself, relative to the mounting bracket 8, a pair only of elongated guide holes 20 and guide bolts or screws 21 being shown at FIG. 2 for the sake of simplification and clarity. The mirror 15 is fastened on the end of a mirror support arm 22 which, on its other end, is provided with a right angle prong 22', best shown at FIG. 2, projecting into a corresponding groove 19' disposed on a side of the plate member 19. It is to be appreciated that the prong 22' is free to be displaced by the plate member 19, thus causing in turn angular displacement of the mirror support arm 22. Correspondingly, the eyepiece mount 16 is supported on the end of a lever 23, generally L-shaped, having its other end provided with a bent-over prong 23' engaged in a slot 19'' formed in the other side of the plate member 19. The pivot or fulcrum axis of the mirror support arm 22, and consequently of the mirror reflecting surface, and the pivot axis or fulcrum axis of the eyepiece support lever 23 coincide as shown at 17, but the distance between the common axis 17 and the projecting prong 22' of the mirror lever arm 22 is twice that of the distance separating the common pivot axis 17 from the driving prong 23' of the eyepiece lever 23.

Pivoting of the eyepiece mount 16, which is shown supporting an eyepiece 24 at FIG. 2, about the fulcrum axis 17 in any one of the two directions arbitrarily represented by the double arrowhead line 25 causes in turn, via the lever 23, a linear displacement of the plate member 19 in the direction represented by the double arrowhead line 26, in turn causing a diverting of the lever arm 22 and of the mirror 15 mounted thereon simultaneously and in the same direction. The diverting of the mirror support lever arm 22, however, is effected only for one half of the diverting angle of the eyepiece mount 16 as a result of the arm length of the lever 22 being twice the arm length of the lever 23. In this manner, there is an assurance that the image reflected by the mirror 15 to the focal plane of the eyepiece 24 during the diverting action of the eyepiece mount 16 remains stable for any adjustment of interocular distance. Consequently, the mechanism of the present invention provides a good binocular viewing of the microfilm at all convenient interocular distances.

Slight deviations from absolutely correct alignment during adjustment of the interocular distance, which occur because the plate member 19 is actuated along a rectilinear direction instead of a turning motion, are negligible for all practical purposes. This is particularly the case when, as in the production model of this embodiment of the invention, the direction of reciprocating motion of the plate member 19 is parallel to the optical axis of the eyepieces during adjustment to the narrowest interocular distance, as represented in solid lines at FIG. 1, and the eyepiece mount lever 23 and the mirror lever 22 are mounted relative to the plate member 19 so that they are in perfect alignment when set to the middle interocular distance as represented at FIG. 2. In this middle position of the drive mechanism, the mirror 15 has been turned exactly one half of the turn angle of the eyepiece mount 16, i.e., there is no misalignment present for such middle position. It will be appreciated that, away from this exact middle position, during swivelling of the eyepiece mount 16 and consequently eyepiece 24 in either direction to the maximum and mimimum interocular distance, there is still a very good approximation of the achieved rotation of the mirror 15, consisting of half of the angle of pivoting of the eyepiece 24.

As can be seen in FIG. 1, the mirror support lever 22 is provided on its end with a spring tension adjustment screw 27 for the original alignment of the angle of the mirror 15. For that purpose, the mirror support lever 22 is shaped accordingly on its end portion in the form of a bracket through which the adjustment screw 27 is threaded, the end of the adjustment screw engaging an abutment, not shown, dependent from the support bracket 8, such that the original position of the mirror 15 as determined by the original position of the arm 22 may be initially set, and re-set if necessary, by means of a screw driver after separating the housing 3 from the housing enclosure 2. For better clarity at FIG. 2, the end portion of the lever 22 and the adjustment screw have been eliminated. Only adjustment after assembly of the apparatus is generally required prior to first operating the viewer. Any other suitable adjustment means may be provided such as, for example, excentrically adjustable pins in replacement of the prong 22' on the end of the lever 22, and the like.

At FIG. 2, a spring 28 is shown mounted in tension between an anchoring point proximate the end of the mirror support lever 22 and the longer arm of the eyepiece L-shaped support lever 23, proximate the eyepiece mount 16, for the purpose of eliminating any mechanical tolerance or play within the adjustment drive mechanism of the invention. In this manner, all the component parts, including the plate member 19, are preloaded against each other, with the result of a greatly improved accuracy of the whole mechanism for the adjustment of the interocular distance.

Mention should also be made of the fact that the whole mechanism of the invention is normally enclosed in an appropriate housing, preferably made of plastic, which improves greatly the contrast of the image observed by preventing ambiant light from leaking into the interior of the housing. For that purpose, the eyepiece mount 16 which is adjustably displaceable through a slot 29 in the housing wall, is provided with an appropriate light shielding plate 30 as can be seen at FIG. 1.

Figure 3:
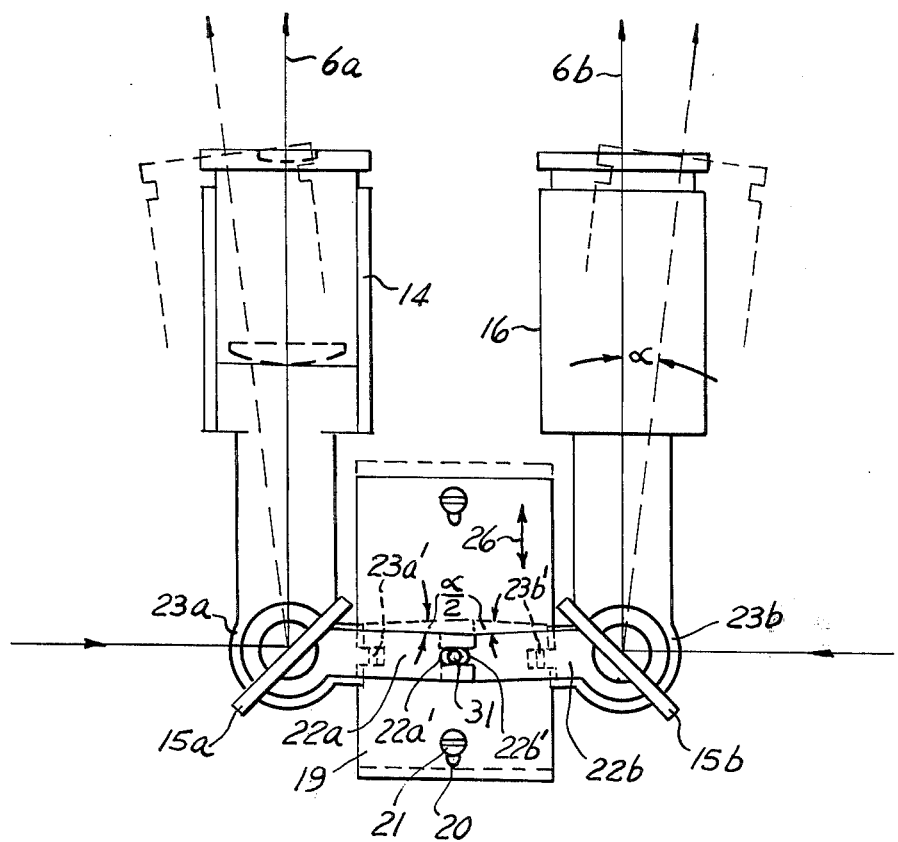
FIG. 3 is a partial view similar to FIG. 1 but showing a modification of the present invention.

FIG. 3 illustrates a modification of the present invention wherein both eyepiece mounts 14 and 16 are pivotable relative to the housing, not shown, for accomodating varied interocular distances. For that purpose, the eyepiece mounts 14, 16, are supported on the end of L-shaped levers 23a, 23b, respectively. A pair of pivotable mirrors 15a and 15b is supported by pivotable levers 22a and 22b, respectively. The ends of the levers 23a and 23b are coupled to the movable plate member 19 by means of prongs 23a' and 23b', respectively, in the same manner as previously explained in detail, while the end of the levers 22a and 22b are coupled to the plate member 19 by way of a pin 31 mounted on the plate at its center line, projecting through slits 22a' and 22b' formed respectively on the end of the levers 22a and 22b, respectively. The mirror 15a deflects the light beam 6a through the eyepiece mounted in the eyepiece mount 14, while the mirror 15b deflects the light beam 6b through the eyepiece mounted in the eyepiece mount 16.

The axis of rotation of the reflective surface of the mirror 15a coincides with the axis of rotation of the lever 23a, while the axis of rotation of the reflective surface of the mirror 15b coincides with the axis of rotation of the lever 23b. The length of the levers 23a and 23b between their respective fulcrum points and their slotted ends engaging the pin 31 is twice the length of the levers 23a and 23b between their fulcrum points and their ends 23a' and 23b', respectively, engaged with the side slots of the plate member 19, with the result that any symmetrical rotation of the eyepiece mounts 14, 16, from the position shown in full line to the position shown in dash line about an angle $\alpha$ causes the levers 22a and 22b to swing simultaneously of an angle ($\alpha/2$) from the solid line position to the dash line position, in the manner previously explained.

It will be appreciated that the embodiment of FIG. 3 provides for simultaneous coordinated angular positioning of the eyepiece mounts 14 and 16 to any appropriate desirable interocular distance, while the arrangement just described further permits the light beams 6a and 6b reflected respectively by the mirrors 15a and 15b to remain at all times axed along the optical axis of the eyepieces fitted in the eyepiece mounts 14 and 16. Although the light beams 6a and 6b impinging upon the mirrors 15a and 15b, respectively, has been shown as impinging on the mirror surfaces respectively from the left to the right as shown in the drawing, it will be readily appreciated that the direction of the incident light beams upon the mirror surface may be any other appropriate direction, as long as the mirrors are originally correctly oriented such as to project the reflected light beams with their optical axis aligned with the optical axis of the respective eyepieces.

The apparatus of the present invention has been illustrated in the drawing substantially to a one-to-one scale, and it will be immediately appreciated that the apparatus is particularly compact and, although it is provided with a high magnification, it requires very little space and is made up of a small inventory of parts.

Because of its small size, the microfilm viewer of the present invention may be used to advantage in the field such as on a construction site where drawings, parts lists, specifications, and other data previously recorded at a reduced scale on microfilm or michofiche may be comfortably and rapidly read. Other applications of the present invention in its portable form are especially suited for the requirements of technical, and other, units of the army and the like. The illumination of the microfilm is entirely independent of the availability of an electrical outlet or even a motor vehicle battery, as the power supply for the illuminating lamp may consist of dry cell batteries or rechargable batteries contained in the lamp housing enclosure 2.

Having thus described the present invention by way of practical embodiments thereof, modifications whereof will be apparent to those skilled in the art, what is claimed as new is:

1. In a mechanism for the adjustment of interocular distance in binocular optical apparatus provided with objective and eyepiece lens systems whereby a magnified image of an object is provided at said eyepieces, a plurality of mirrors disposed between said object and said eyepieces, wherein at least one eyepiece is movable to angularly position the optical axis of one said movable eyepiece relative to the axis of the other eyepiece for providing diverse interocular distances corresponding to variations of human eye separations, the improvement comprising a rotatable mirror disposed in the optical axis of one said movable eyepiece and means for angularly rotating said mirror at one half the angular rate of one said movable eyepiece, said means comprising a plate member linearly displaceable, a pair of levers having a common fulcrum axis, the first of said levers supporting said rotatable mirror for rotation of the reflecting surface of said mirror about said fulcrum axis, said first lever having an end attached to said plate member for displacement thereby, the second of said levers having an arm supporting one said movable eyepiece and another arm connected to said plate member such that said rotation of said eyepiece causes linear motion of said plate member and pivoting of said first lever about said fulcrum axis, said first lever and the second arm of said second lever having lengths in the ratio of 2 to 1 such that for every pivoting of said eyepiece about a predetermined angle said mirror is pivoted of one half of said angle.

2. The improvement of claim 1 wherein said object is a microfilm transparency.

3. The improvement of claim 1 wherein said plate member is displaced in a direction substantially parallel to the optical axis of one said movable eyepiece at a setting corresponding to the narrowest interocular distance, and wherein said rotatable mirror is originally set at the position whereby when said movable eyepiece is positioned at a mid position between extreme interocular distances, said mirror is rotated substantially exactly one half of the angle of one rotation of said movable eyepiece.

4. The improvement of claim 1 further comprising adjustment screw means for determining a basic reference of the mirror angle setting.

5. The improvement of claim 3 further comprising adjustment screw means for determining a basic reference of the mirror angle setting.

6. The improvement of claim 1 further comprising spring bias means for preloading the surfaces in engagement of said levers and said plate member for eliminating mechanical tolerances and play.

7. The improvement of claim 3 further comprising spring bias means for preloading the surfaces in engagement of said levers and said plate member for eliminating mechanical tolerances and play.

8. The improvement of claim 4 further comprising spring bias means for preloading the surfaces in engagement of said levers and said plate member for eliminating mechanical tolerances and play.

9. The improvement of claim 5 further comprising spring bias means for preloading the surfaces in engagement of said levers and said plate member for eliminating mechanical tolerances and play.

10. The improvement of claim 1 wherein both said eyepieces are angularly symmetrically positionable at a relative mutual angle, each of said eyepieces being mounted on the end of an L-shaped lever having fulcrum axes symmetrically disposed relative to said plate member, and a pair of said rotatable mirrors is provided each mounted with its deflecting surface disposed at the fulcrum axis of a second lever having an end driven by a projecting member disposed substantially at the longitudinal axis of displacement of said plate member, the arm length of said second lever being twice that of said first lever such that for each mutual angular displacement of said eyepieces of a given angle there corresponds one half that angle angular displacement of said mirrors.

11. The improvement of claim 3 wherein both said eyepieces are angularly symmetrically positionable at a relative mutual angle, each of said eyepieces being mounted on the end of an L-shaped lever having fulcrum axes symmetrically disposed relative to said plate member, and a pair of said rotatable mirrors is provided each mounted with its deflecting surface disposed at the fulcrum axis of a second lever having an end driven by a projecting member disposed substantially at the longitudinal axis of displacement of said plate member, the arm length of said second lever being twice that of said first lever such that for each mutual angular displacement of said eyepieces of a given angle there corresponds one half that angle angular displacement of said mirrors.

12. The improvement of claim 4 wherein both said eyepieces are angularly symmetrically positionable at a relative mutual angle, each of said eyepieces being mounted on the end of an L-shaped lever having fulcrum axes symmetrically disposed relative to said plate member, and a pair of said rotatable mirrors is provided each mounted with its deflecting surface disposed at the fulcrum axis of a second lever having an end driven by a projecting member disposed substantially at the longitudinal axis of displacement of said plate member, the arm length of said second lever being twice that of said first lever such that for each mutual angular displacement of said eyepieces of a given angle there corresponds one half that angle angular displacement of said mirrors.

13. The improvement of claim 5 wherein both said eyepieces are angularly symmetrically positionable at a relative mutual angle, each of said eyepieces being mounted on the end of an L-shaped lever having fulcrum axes symmetrically disposed relative to said plate member, and a pair of said rotatable mirrors is provided each mounted with its deflecting surface disposed at the fulcrum axis of a second lever having an end driven by a projecting member disposed substantially at the longitudinal axis of displacement of said plate member, the arm length of said second lever being twice that of said first lever such that for each mutual angular displacement of said eyepieces of a given angle there corresponds one half that angle angular displacement of said mirrors.

14. The improvement of claim 6 wherein both said eyepieces are angularly symmetrically positionable at a relative mutual angle, each of said eyepieces being mounted on the end of an L-shaped lever having fulcrum axes symmetrically disposed relative to said plate member, and a pair of said rotatable mirrors is provided each mounted with its deflecting surface disposed at the fulcrum axis of a second lever having an end driven by a projecting member disposed substantially at the longitudinal axis of displacement of said plate member, the arm length of said second lever being twice that of said first lever such that for each mutual angular displacement of said eyepieces of a given angle there corresponds one half that angle angular displacement of said mirrors.

15. The improvement of claim 7 wherein both said eyepieces are angularly symmetrically positionable at a relative mutual angle, each of said eyepieces being mounted on the end of an L-shaped lever having fulcrum axes symmetrically disposed relative to said plate member, and a pair of said rotatable mirrors is provided each mounted with its deflecting surface disposed at the fulcrum axis of a second lever having an end driven by a projecting member disposed substantially at the longitudinal axis of displacement of said plate member, the arm length of said second lever being twice that of said first lever such that for each mutual angular displacement of said eyepieces of a given angle there corresponds one half that angle angular displacement of said mirrors.

16. The improvement of claim 8 wherein both said eyepieces are angularly symmetrically positionable at a relative mutual angle, each of said eyepieces being mounted on the end of an L-shaped lever having fulcrum axes symmetrically disposed relative to said plate member, and a pair of said rotatable mirrors is provided each mounted with its deflecting surface disposed at the fulcrum axis of a second lever having an end driven by a projecting member disposed substantially at the longitudinal axis of displacement of said plate member, the arm length of said second lever being twice that of said first lever such that for each mutual angular displacement of said eyepieces of a given angle there corresponds one half that angle angular displacement of said mirror.

17. The improvement of claim 9 wherein both said eyepieces are angularly symmetrically positionable at a relative mutual angle, each of said eyepieces being mounted on the end of an L-shaped lever having fulcrum axes symmetrically disposed relative to said plate member, and a pair of said rotatable mirrors is provided each mounted with its deflecting surface disposed at the fulcrum axis of a second lever having an end driven by a projecting member disposed substantially at the longitudinal axis of displacement of said plate member, the arm length of said second lever being twice that of said first lever such that for each mutual angular displacement of said eyepieces of a given angle there corresponds one half that angle angular displacement of said mirror.

* * * * *